US008731121B2

(12) United States Patent
Lopez et al.

(10) Patent No.: US 8,731,121 B2
(45) Date of Patent: May 20, 2014

(54) METHOD AND ARRANGEMENT IN A TELECOMMUNICATION SYSTEM (75) Inventors: Miguel Lopez, Solna (SE); Henrik Sahlin, Mölnlycke (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 667 days.

(21) Appl. No.: 13/014,090

(22) Filed: Jan. 26, 2011

(65) Prior Publication Data
US 2011/0188563 A1 Aug. 4, 2011

Related U.S. Application Data (60) Provisional application No. 61/299,050, filed on Jan. 28, 2010.

(51) Int. Cl.
H04B 1/10 (2006.01)
(52) U.S. Cl.
USPC .............................. 375/350; 375/316; 375/340
(58) Field of Classification Search
CPC ............ H04L 25/0224; H04L 25/0204; H04L 25/03343; H04L 25/03038; H04L 25/067; H04L 2025/03802; H04L 2025/03414; H04B 7/0851
USPC .................. 375/316, 340, 350; 455/63.1, 500
See application file for complete search history.

(56) References Cited

U.S. PATENT DOCUMENTS

| 7,380,151 | B1 | 5/2008 | Bahai |
| 8,170,047 | B2 | 5/2012 | Andersen et al. |
| 2003/0198303 | A1* | 10/2003 | Taylor et al. .................. 375/340 |
| 2008/0064337 | A1* | 3/2008 | Saily et al. ................... 455/63.1 |
| 2009/0075686 | A1* | 3/2009 | Gomadam et al. ............ 455/500 |
| 2010/0061698 | A1 | 3/2010 | Morello et al. |
| 2011/0158338 | A1 | 6/2011 | Choi et al. |
| 2011/0182372 | A1 | 7/2011 | Song et al. |
| 2011/0207451 | A1 | 8/2011 | Brauer et al. |

OTHER PUBLICATIONS

Office Action issued in U.S. Appl. No. 13/014,032 dated Jun. 5, 2013.
Written Opinion issued in Application No. PCT/SE2011/050081 dated Jun. 10, 2011.
International Search Report issued in Application PCT/SE2011/050081 dated Jun. 10, 2011.
International Search Report and Written Opinion mailed Jul. 11, 2008 in PCT Application No. PCT/SE2011/050081.
Linglong, Dai et al., "A Novel Time Domain Synchronous Orthogonal Frequency Division Multiple Access Scheme", Global Telecommunications Conference, Nov. 30, 2009, pp. 1-6, XP031646418.
Fang Yang et al., "Novel Channel Estimation Method Based on PN Sequence Reconstruction for Chinese DTTB System", IEEE Transactions on Consumer Electronics, IEEE Service Center, vol. 54, No. 4, Nov. 1, 2008, pp. 1583-1589, XP011239717.

(Continued)

Primary Examiner — Daniel Washburn
Assistant Examiner — Fitwi Hailegiorgis
(74) Attorney, Agent, or Firm — Nixon & Vanderhye, P.C.

(57) ABSTRACT

By exploiting the multi-block structure of the used slot format having a training sequence in the time domain and at least one pre-coded user data block to sequentially reconstruct the slot, using in the first act known symbols and using detected symbols in each subsequent act and improved receiver may be provided. This may result in less ISI/IBI and therefore increased performance.

7 Claims, 14 Drawing Sheets

(56) References Cited

OTHER PUBLICATIONS

DVB Organization: "T2_0198 CfT Response SIDSA_CSS_Estimation.pds", DVB, Digital Video Broadcasting, Jun. 4, 2007, XP017817441.

Telefon AB LM Ericsson: "Precoded EGPRS2 Downlink", 3GPP TSG GERAN45 GP-100364, Feb. 26, 2010, pp. 1-21, XP002638765.

Liu et al, "A Novel Iterative Data-Aided Channel Estimation for Time Domain Synchronous-OFDM", Fourth International Workshop on Signal Design and Its Applications in Communications, 2009, IWSDA 2009, IEEE, Piscataway, NJ, Oct. 19, 2009, pp. 48-51.

International Search Report and Written Opinion mailed Apr. 18, 2011 in PCT application PCT/SE2011/050083.

Official Action dated Jan. 15, 2013 in U.S. Appl. No. 13/014,032.

EP Office Action mailed Apr. 25, 2013 in EP application 11703290.4.

3GPP TS 45.001, "*Physical layer on the radio path*" Technical Specification Group GSM/EDGE Radio Access Network; 3rd Generation Partnership Project, V9.1.0, Nov. 2009.

3GPP TS 45.004, "*Modulation*" Technical Specification Group GSM/EDGE Radio Access Network; 3rd Generation Partnership Project, (Release 1999), Dec. 2009.

B. Muquet, Z. Wang, G.B. Giannakis, M. de Courville, and P. Duhamel, "*Cyclic Prefixing or Zero Padding for Wireless Multicarrier Transmissions*" IEEE Transactions on communications, vol. 50, No. 12, Dec. 2002.

\* cited by examiner

Normal Burst:

148 samples or symbols

Slot format 1a:

| User data 122 samples | Training seq. 26 samples | GP 8.25 |
|---|---|---|

Slot format 1b:

| User data 60 samples | ZP 2 | User data 60 samples | Training seq. 26 samples | GP 8.25 |
|---|---|---|---|---|

Slot format 1c:

| User data | ZP | User data | ZP | User data | Training seq. 26 samples | GP 8.25 |
|---|---|---|---|---|---|---|

Slot format 1d:

| User data | ZP | User data | ZP | User data | ZP | User data | Training seq. 26 samples | GP 8.25 |
|---|---|---|---|---|---|---|---|---|

Figure 2

Slot format 2a:

| Training sequence 26 samples | User data 122 samples | GP 8.25 |
|---|---|---|

Slot format 2b:

| Training sequence 26 samples | User data 60 samples | ZP 2 | User data 60 samples | GP 8.25 |
|---|---|---|---|---|

Slot format 2c:

| Training sequence 26 samples | User data | ZP | User data | ZP | User data | GP 8.25 |
|---|---|---|---|---|---|---|

Slot format 2d:

| Training sequence | User data | ZP | User data | ZP | User data | ZP | User data | GP 8.25 |
|---|---|---|---|---|---|---|---|---|

Figure 3

Slot format 3a:

| TB 3 | User data 119 samples | Training seq. 26 samples | GP 8.25 |
|---|---|---|---|

Slot format 3b:

| TB 3 | User data 116 samples | Training seq. 26 samples | TB 3 | GP 8.25 |
|---|---|---|---|---|

Slot format 3c:

| TB | User data | ZP | User data | Training seq. 26 samples | GP 8.25 |
|---|---|---|---|---|---|

Slot format 3d:

| TB | User data | ZP | User data | Training seq. 26 samples | TB | GP 8.25 |
|---|---|---|---|---|---|---|

Slot format 3e:

| TB | User data | ZP | User data | ZP | User data | Training seq. 26 samples | GP 8.25 |
|---|---|---|---|---|---|---|---|

Slot format 3f:

| TB | User data | ZP | User data | ZP | User data | Training seq. 26 samples | TB | GP 8.25 |
|---|---|---|---|---|---|---|---|---|

Slot format 3g:

| TB | User data | ZP | User data | ZP | User data | ZP | User data | Training seq. 26 samples | GP 8.25 |
|---|---|---|---|---|---|---|---|---|---|

Slot format 3h:

| TB | User data | ZP | User data | ZP | User data | ZP | User data | Training seq. 26 samples | TB | GP 8.25 |
|---|---|---|---|---|---|---|---|---|---|---|

Figure 4

Slot format 4a:

| Training seq. 26 samples | User data 119 samples | TB 3 | GP 8.25 |
|---|---|---|---|

Slot format 4b:

| TB 3 | Training seq. 26 samples | User data 116 samples | TB 3 | GP 8.25 |
|---|---|---|---|---|

Slot format 4c:

| Training seq. 26 samples | User data | ZP | User data | TB | GP 8.25 |
|---|---|---|---|---|---|

Slot format 4d:

| TB | Training seq. 26 samples | User data | ZP | User data | TB | GP 8.25 |
|---|---|---|---|---|---|---|

Slot format 4e:

| Training seq. 26 samples | User data | ZP | User data | ZP | User data | TB | GP 8.25 |
|---|---|---|---|---|---|---|---|

Slot format 4f:

| TB | Training seq. 26 samples | User data | ZP | User data | ZP | User data | TB | GP 8.25 |
|---|---|---|---|---|---|---|---|---|

Slot format 4g:

| Training sequence | User data | ZP | User data | ZP | User | ZP | User data | TB | GP 8.25 |
|---|---|---|---|---|---|---|---|---|---|

Slot format 4h:

| TB | Training sequence | User data | ZP | User data | ZP | User | ZP | User data | TB | GP 8.25 |
|---|---|---|---|---|---|---|---|---|---|---|

Figure 5

Slot format 5a:

| TB 3 | User data 58 samples | Training seq. 26 samples | User data 58 samples | TB 3 | GP 8.25 |
|---|---|---|---|---|---|

Slot format 5b:

| TB 3 | User data | Training seq. 26 samples | User data | GP 8.25 |
|---|---|---|---|---|

Slot format 5c:

| User data | Training seq. 26 samples | User data | TB 3 | GP 8.25 |
|---|---|---|---|---|

Slot format 5d:

| TB 3 | User data | ZP | User data | Training seq. 26 samples | User data | ZP | User data | TB 3 | GP 8.25 |
|---|---|---|---|---|---|---|---|---|---|

Slot format 5e:

| TB 3 | User data | ZP | User data | Training seq. 26 samples | User data | ZP | User data | GP 8.25 |
|---|---|---|---|---|---|---|---|---|

Slot format 5f:

| User data | ZP | User data | Training seq. 26 samples | User data | ZP | User data | TB 3 | GP 8.25 |
|---|---|---|---|---|---|---|---|---|

Received Slot format 1a with training sequence subtracted:

Received Slot format 1a after "overlap-and-add":

Figure 9

Received Slot format 1b:

Received Slot format 1b after "overlap-and-add":

Figure 10

Received Slot format 6b:

Received Slot format 6b":

METHOD AND ARRANGEMENT IN A TELECOMMUNICATION SYSTEM

CROSS-REFERENCE

This application claims the benefit of U.S. Provisional Application No. 61/299,050 filed Jan. 28, 2010, the entire contents of which is hereby incorporated by reference.

FIELD OF THE INVENTION

The technology disclosed herein relates to a method and arrangement in a telecommunication system, in particular to a block sequential receiver for compatible block based pre-coded slot format.

BACKGROUND

Despite the fact that Global System for Mobile communication (GSM) networks have been commercially deployed for almost two decades, interest on the continued improvement of the GSM/EDGE (Enhanced Data for GSM Evolution) technology has not dwindled. Network equipment manufacturers, mobile equipment manufacturers and telecom operators continue to be keen on developing further the GSM system. Improvements to the hardware and spectral efficiencies for both voice and packet data services are being actively sought.

Figure 1:
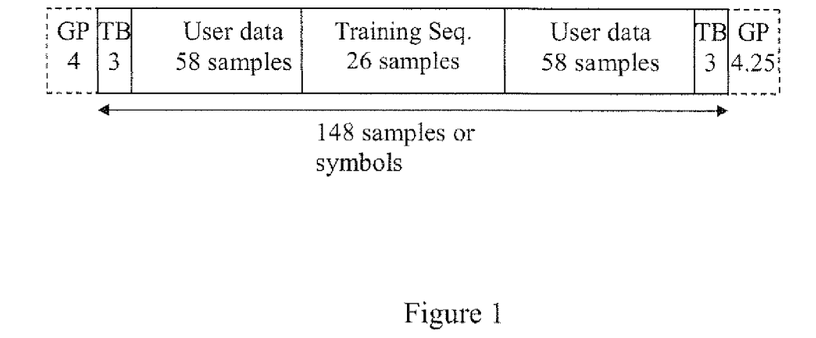
FIG. 1 shows example slot format for normal burst with Guard, Tail Bits (TB), user data, and training sequence.

The slot format used for normal bursts in GSM, GPRS (General Packet Radio Service), enhanced GPRS (EGPRS) and EGPRS2A is illustrated in FIG. 1, as specified in "3GPP TS 45.001, "Physical layer on the radio path" Technical Specification Group GSM/EDGE Radio Access Network; 3rd Generation Partnership Project". Here, the description is based on samples at rate $F_s = 13000/48 \approx 270.83$ kHz, which also is the normal symbol rate within a slot. The slot format is built out of 148 symbols with 3 tail symbols, 58 encoded data symbols, 26 training sequence symbols, 58 encoded data symbols, and finally 3 tail symbols. A guard of 825 samples is introduced to separate adjacent time slots. Eight such slots are placed sequentially in time constructing a TDMA frame see "3GPP TS 45.001, "Physical layer on the radio path" Technical Specification Group GSM/EDGE Radio Access Network; 3rd Generation Partnership Project". One user may be allocated one or several of these slots within a TDMA frame.

A training sequence is a sequence known to the receiver. This is inserted into the slot such that the receiver may estimate distortions of the received signal after it is transmitted. The receiver may then compensate for these distortions such that the reliability of the communication is increased. Examples of distortions which may be estimated by help of the training sequence are Transmitter and receiver filters impulse responses
Radio channel impulse response
Timing offset
Noise variance
Noise correlations between antennas (in receivers with multiple antenna branches)
Carrier frequency offset The training sequence may also be used in order to do blind detection of used modulation.

With the use of wireless packet data communication, the need for higher peak rate and higher spectral efficiency is increasing. Especially, the need for higher bit rates at low to medium signal to interference and noise ratios (SINR) are wanted. This results in the need for alternative slot formats which are robust without sacrificing high peak rate for high SINR.

The slot formats in Third Generation Partnership Project (3GPP) technical specification TS 45.001 with the modulation (as specified in "3GPP TS 45.004, "Modulation" Technical Specification Group GSM/EDGE Radio Access Network; 3rd Generation Partnership Project, (Release 1999)", incorporated herein by reference), and transmitter filter (as specified also in 3GPP TS 45.004), result in a received signal with inter-symbol-interference (ISI). The physical radio channel further increases the amount of ISI. As a result, the receiver has to rely on advanced algorithms in order to detect transmitted symbols and recover the transmitted bit sequence. The received signal is further distorted by transmitter and receiver imperfections (resulting in e.g. phase noise), carrier frequency offset, timing errors, co-channel and adjacent channel interference etc.

Hence robust receiver algorithms are needed for alternative slots formats based on Zero padding or Cyclic Prefix.

SUMMARY

The technology disclosed herein provides, e.g., an improved method and device to address the problems as outlined above.

In the receiver channel estimates may be sequentially performed and user data blocks are equalized and detected, with a subtraction of known and detected symbols.

The receiver algorithm may sequentially remove blocks of training sequences, tail bits, and user data blocks in the order in which these are equalized and detected. In this way, the ISI or inter-block interference (IBI) may be decreased or removed. Furthermore, channel estimates, carrier frequency offset estimates etc. may be improved for each step or act in these block sequential receivers.

By using a pre-filter, the length of the zero padding or cyclic prefix may be shortened compared to not having a pre-filter.

Thus in accordance with example embodiments described herein a receiver is used, where blocks are sequentially subtracted from the received signal, and each time the procedure is applied, ISI and IBI are diminished or eliminated. The process may start with the training sequence (that is known) and the channel (that may be estimated from the known training sequence). Using the channel and the training sequence, part of the received signal may be reconstructed. In accordance with one example embodiment the sequence is and then overlapped-and-added to a first data block. This first data block will now suffer from less IBI/ISI. The first data block is then demodulated in the frequency domain. The process may be repeated on the second data block (if there is a second block), and then on the third, etc. For each sequential act or step, the start information is a channel estimate and known symbols (training sequence or previously demodulated symbols). Using the start information it is possible to reconstruct part of the signal by convolving with channel. An overlap and add process may then be applied again.

In accordance with one example embodiment and mode of a method of receiving a signal coded in a slot wherein the slot comprises at least one user data block and a training sequence is provided. The at least one user data block is coded using a pre-coder and the training sequence is modulated in the time domain. When receiving such a signal the receiver sequentially generates receiver channel estimates, and equalizes and detects user data blocks, with a subtraction of known and detected symbols.

In accordance with one example embodiment blocks of training sequences, tail bits, and user data blocks are sequentially removed in the order in which these are equalized and detected.

In accordance with one example embodiment a pre-filter is used for the received signal information.

In accordance with one example embodiment the training sequence convolved with the estimated channel estimate is first subtracted from the received signal.

The technology disclosed herein also extends to and a receiver arranged to perform the methods as described herein. The coder may be provided with a controller/controller circuitry for performing the above methods. The controller(s) may be implemented using suitable hardware and or software. The hardware may comprise one or many processors that may be arranged to execute software stored in a readable storage media. The processor(s) may be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media. The processor may execute instructions stored on non-transitory storage media.

Thus, the multi-block structure of the received signal is used to sequentially decode the slot sequence, using in the first act known symbols and using detected symbols in each subsequent act. This may result in less ISI/IBI and therefore increased performance.

Other objects, advantages and novel features of the technology disclosed herein will become apparent from the following detailed description.

BRIEF DESCRIPTION OF THE DRAWINGS

For a better understanding, reference is made to the following drawings and preferred example embodiments of the technology disclosed herein.

DETAILED DESCRIPTION

Figure 2:
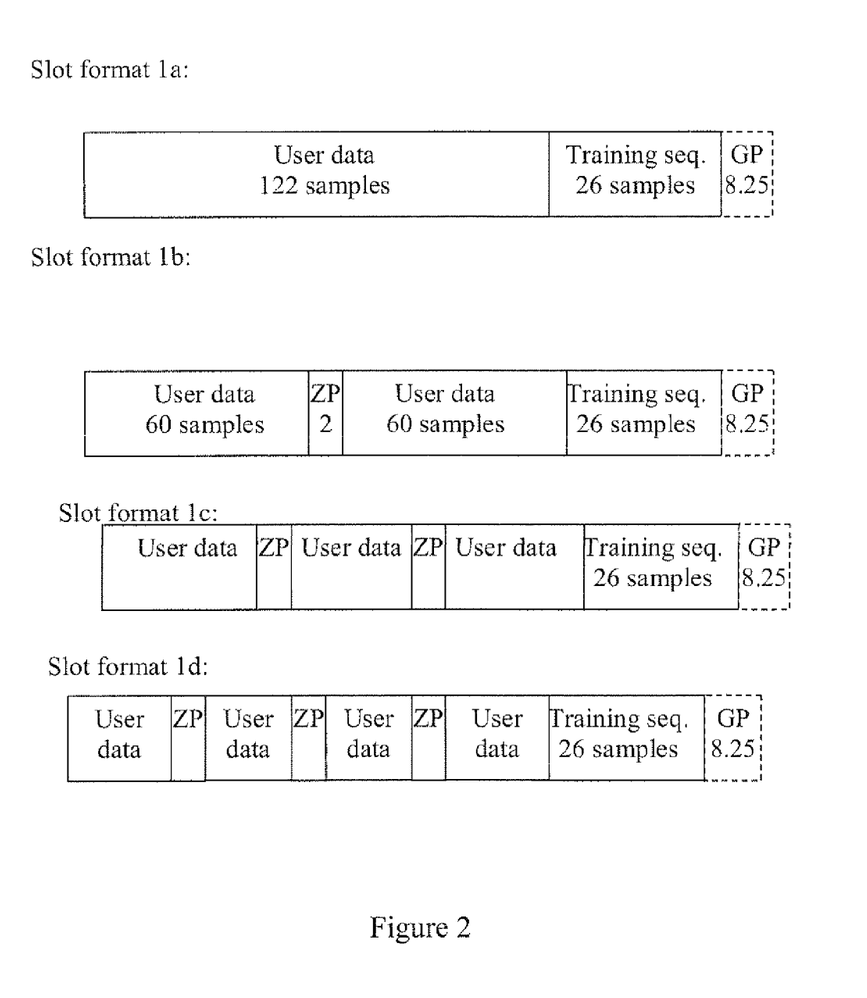
FIG. 2 shows example slot formats with training sequence in the end and a Zero Padding (ZP) between user data blocks.
Figure 3:
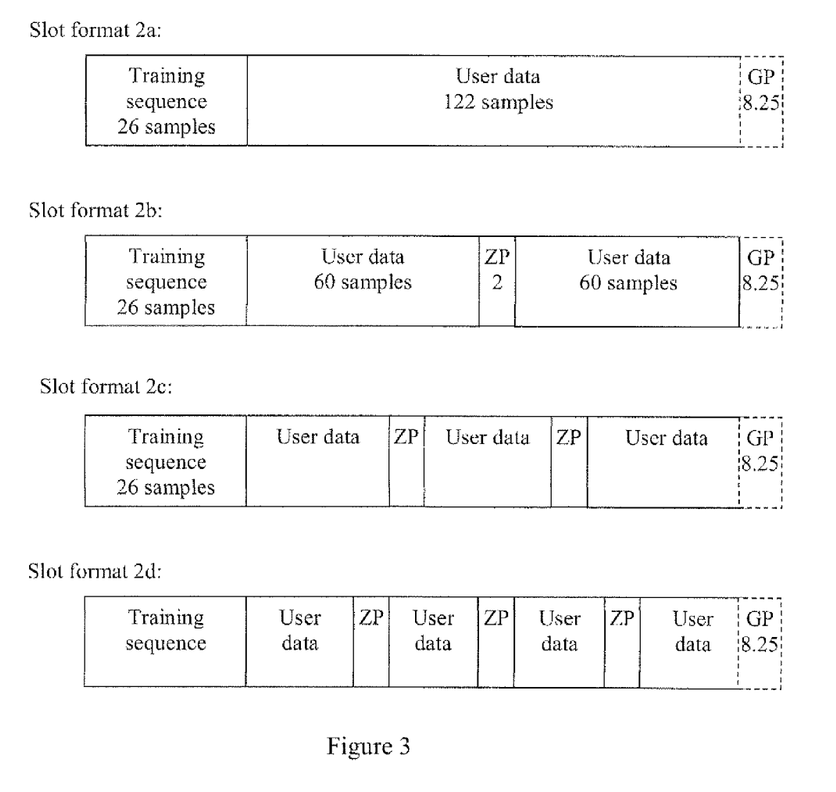
FIG. 3 shows example slot formats with training sequence in the beginning and a Zero Padding (ZP) between user data blocks.

A slot format with the training sequence placed in the end of a slot is illustrated in FIG. 2. Alternatively, the training sequence may be placed in the beginning of a slot as illustrated in FIG. 3.

In another example embodiment, the training sequence is placed in one end of the slot and a small sequence of Tail Bits (TB) in the other end. These tail bits are forming a short sequence of predefined symbols. See FIG. 4 for examples of slots formats with tail bits in the beginning of the slot and FIG. 5 for tail bits in the end of a slot. Tail bits may also be placed adjacent to the training sequence, resulting in an enlarged training sequence. This will increase robustness at the cost of decreased data rate. This small sequence of tail bits together with a training sequence in the other end of the slot facilitates measurements of transmitted power in both ends of the slot.

By having the same length the training sequence (i.e. 26 symbols) as used in GSM, EGPRS and EGPRS2A, see "3GPP TS 45.001, *"Physical layer on the radio path"* Technical Specification Group GSM/EDGE Radio Access Network; 3rd Generation Partnership Project"), similar receiver algorithms and implementations may be re-used, such as channel estimation, noise variance estimation, and timing offset estimation. Other choices of the length of the training sequence are possible.

The slot format may further include a pre-coder to each block of modulated user data symbols. One example of such pre-coder is an IDFT (Inverse Discrete Fourier Transform) such that a block of $N_{DFT}$ user data symbols, $X(k)$ with $0 \leq k \leq N_{DFT}-1$, are transformed to one OFDM symbol as $$x(n) = \sum_{n=0}^{N_{DFT}-1} X(k) e^{j\frac{2\pi nk}{N_{DFT}}}. \tag{1}$$

for $0 \leq n \leq N_{DFT}-1$. These user data symbols $X(k)$ may be of any modulation such as Binary Phase Shift Keying (BPSK), Quadrature Phase Shift Keying (QPSK), 16QAM (Quadrature Amplitude Modulation), 32QAM, 64QAM etc. Other transforms are also possible, such as wavelets, DCT (Discrete Cosine Transform), Hartley transform, etc.

Figure 4:
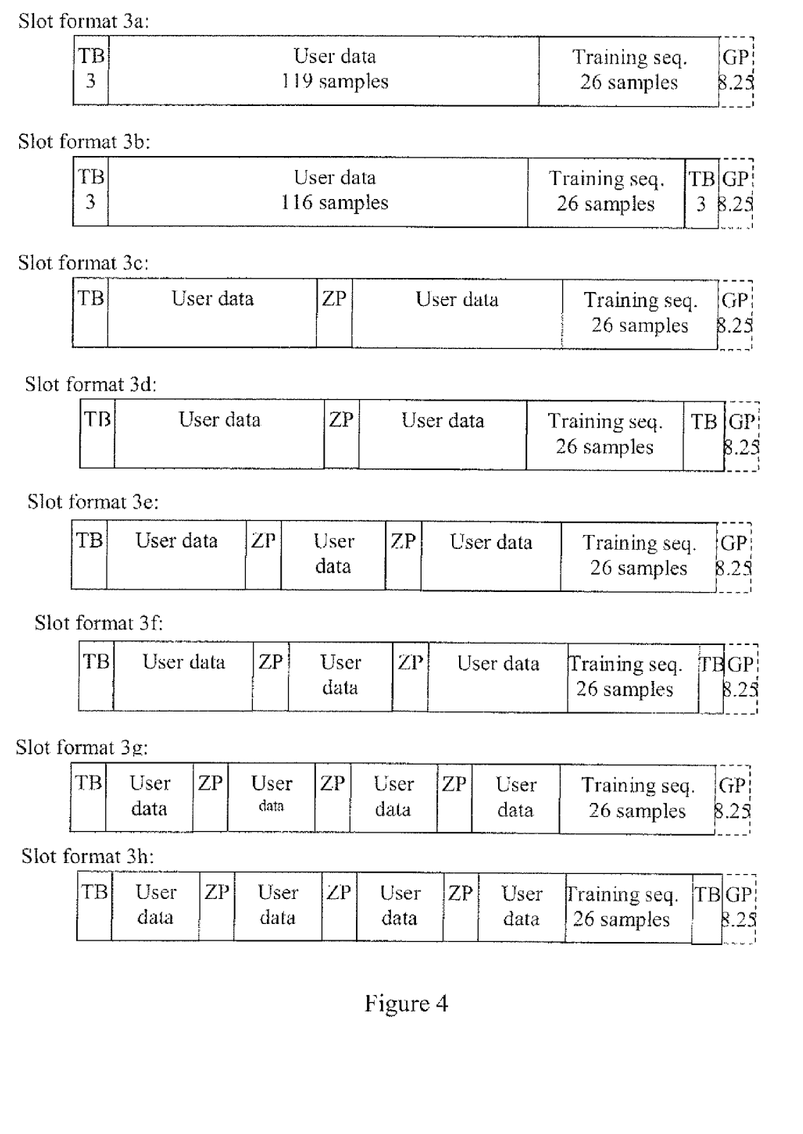
FIG. 4 shows example slot formats with training sequence in the end of the slot, Tail Bits (TB) in the beginning and a Zero Padding (ZP) between user data blocks.
Figure 5:
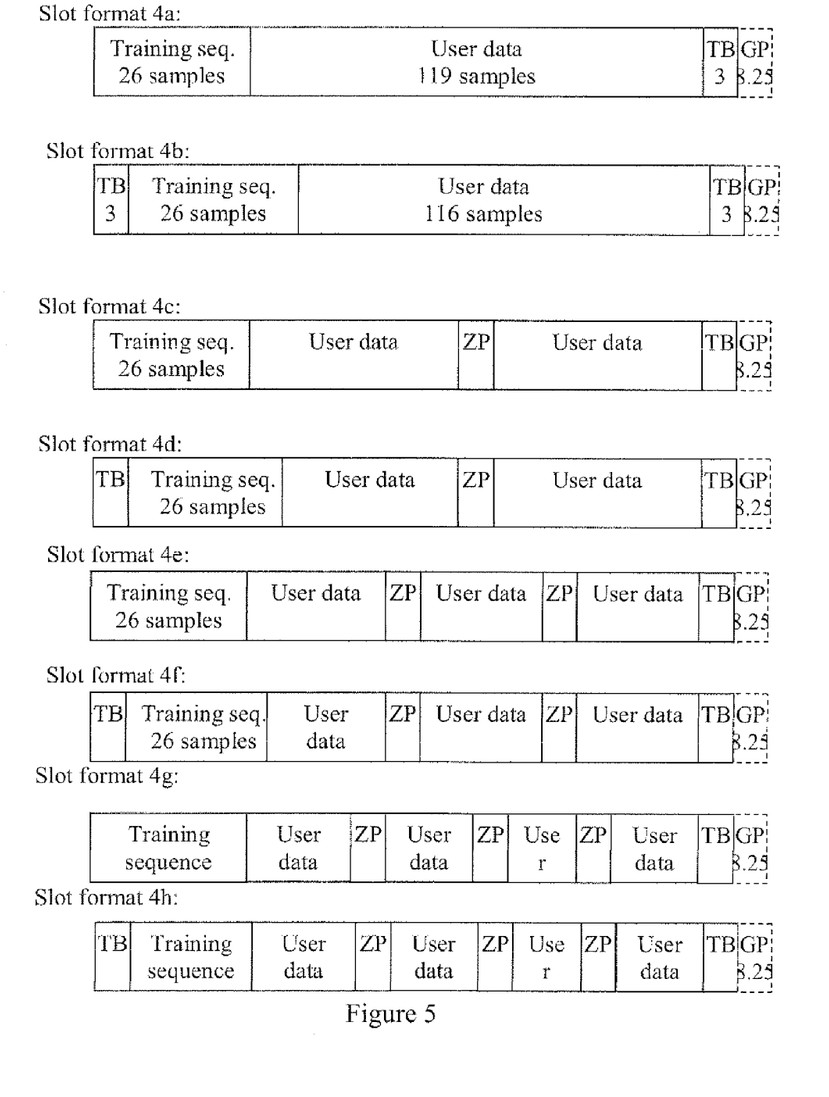
FIG. 5 shows example slot formats with training sequence in the beginning of the slot and Tail Bits (TB) in the end and a Zero Padding (ZP) between user data blocks.
Figure 6:
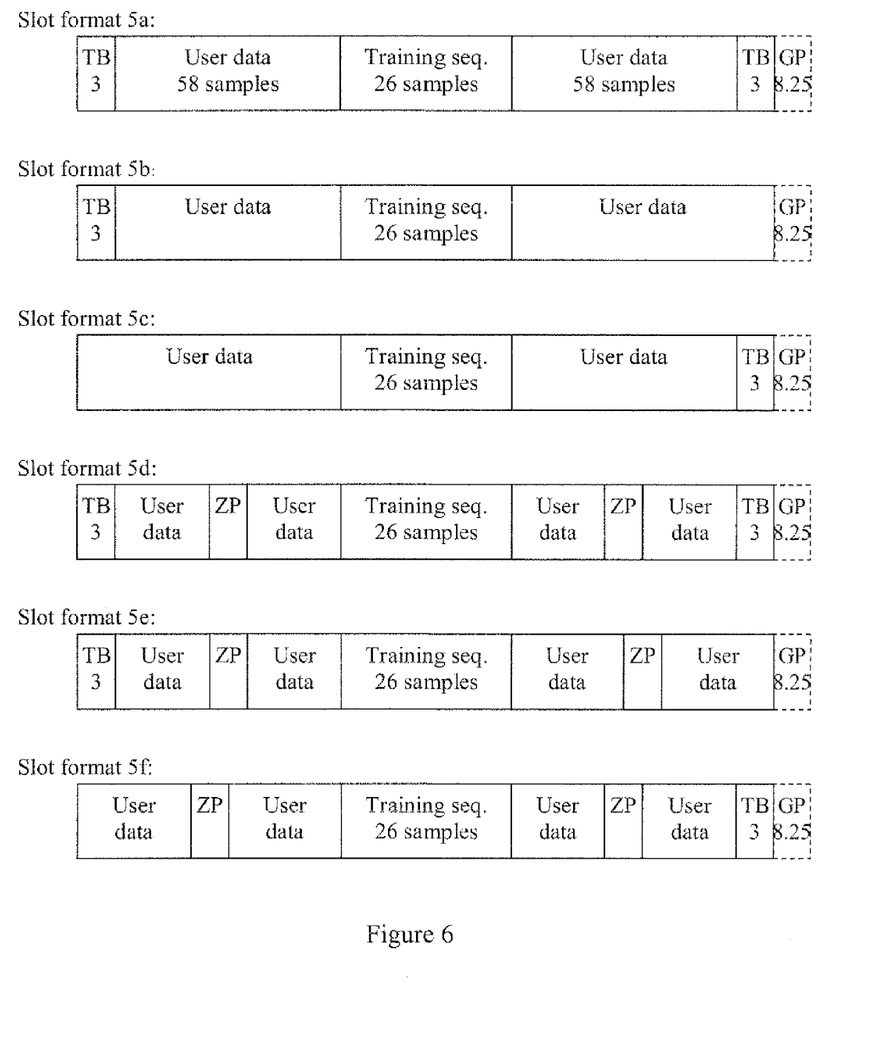
FIG. 6 shows example Slot formats with training sequence in the central part of the slot.
Figure 7:
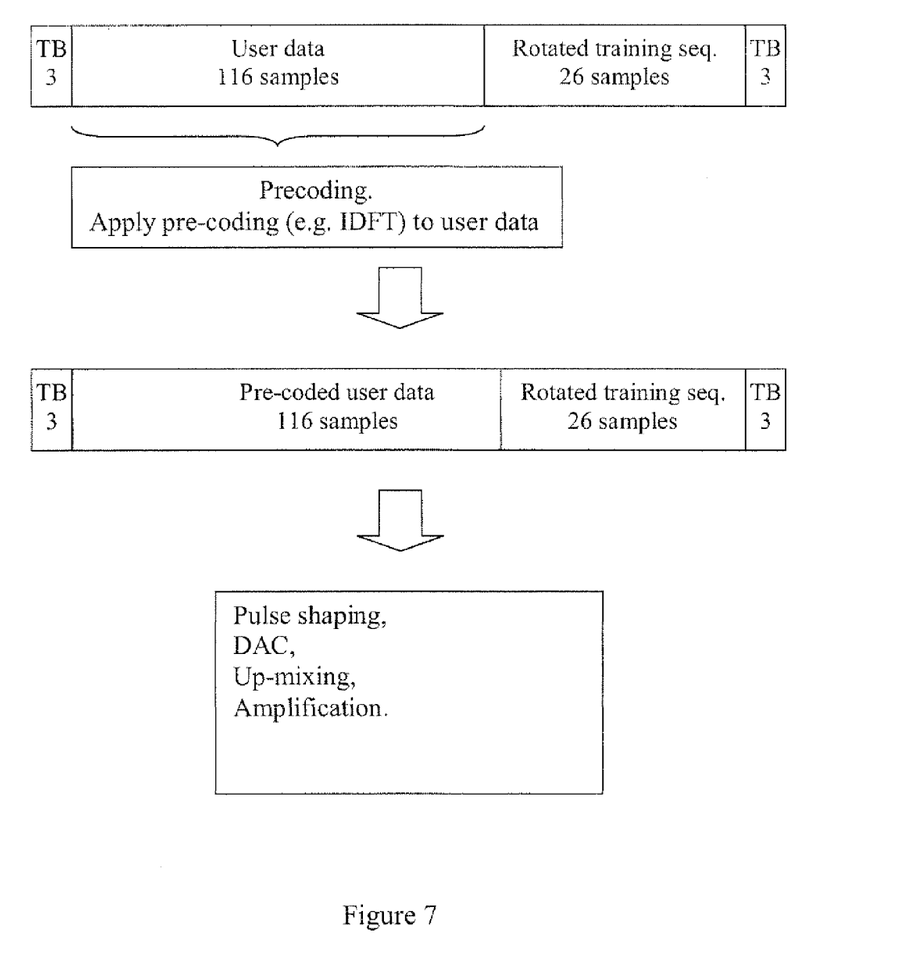
FIG. 7 shows an example of pre-coding and modulation using proposed slot format 3b from FIG. 4.

A slot format with two user data blocks is illustrated as "slot format 1b" within FIG. 2. Here two user data blocks are pre-coded individually, thus forming two Orthogonal Frequency Division Multiplexing (OFDM) symbols. Also, slot formats with other numbers of user data blocks are illustrated in FIG. 3 to FIG. 5 together with different placements of training sequences and use of tail bits.

Figure 8:
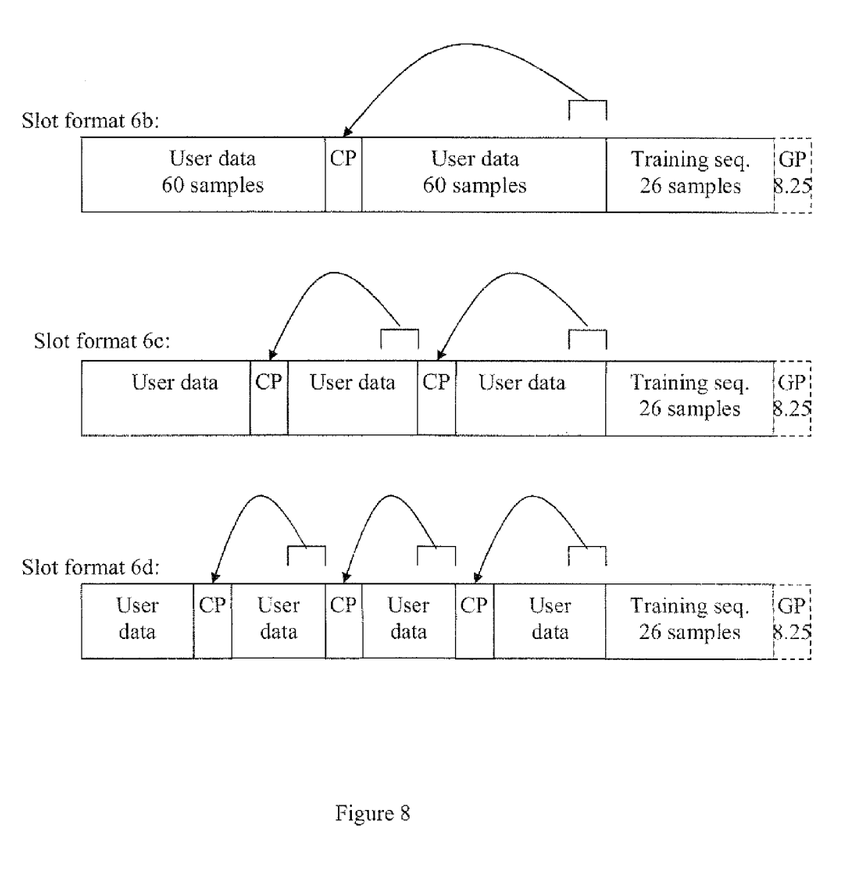
FIG. 8 shows example slot formats with training sequence in the end and a Cyclic Prefix (CP) between user data blocks.

A Zero Padding (ZP) is included between the user data blocks in FIG. 2 to FIG. 5. This is a short interval where the transmitted samples are equal to zeros. These ZP may be used in an "overlap-and-add" approach. An alternative to using ZP is to use a Cyclic Prefix (CP) between the user data blocks as illustrated in FIG. 8.

The purpose of a pre-filter is to change the characteristic of the channel impulse response such that the first channel taps are as large as possible. This pre-filter may be calculated from the channel estimate and after that be applied to the whole burst. The impact length of the channel impulse response is then significantly shortened and thus the time dispersion due to the channel is effectively reduced. Regarding the slot format, this implies that much shorter ZP or CP may be used in designing the slot format. Furthermore, the receiver algorithms may be simplified e.g. in terms of smaller "overlap-and-add" regions as described above.

Figure 12:
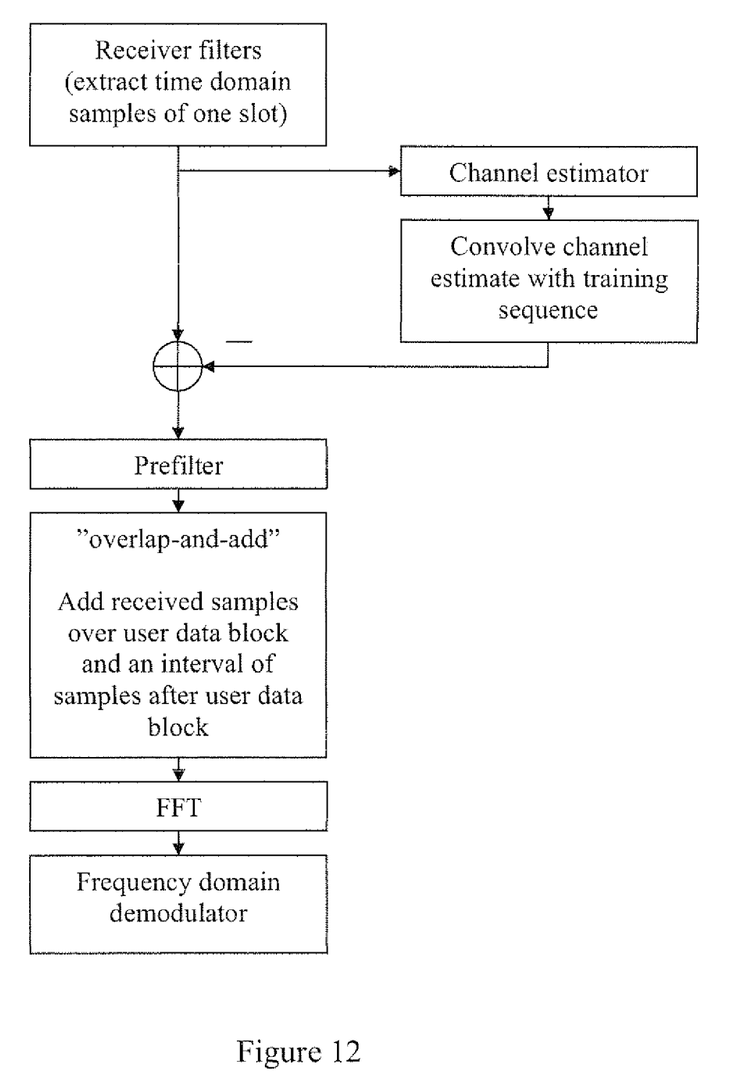
FIG. 12 shows an example receiver structure for proposed "slot format 1b" in FIG. 2.
Figure 13:
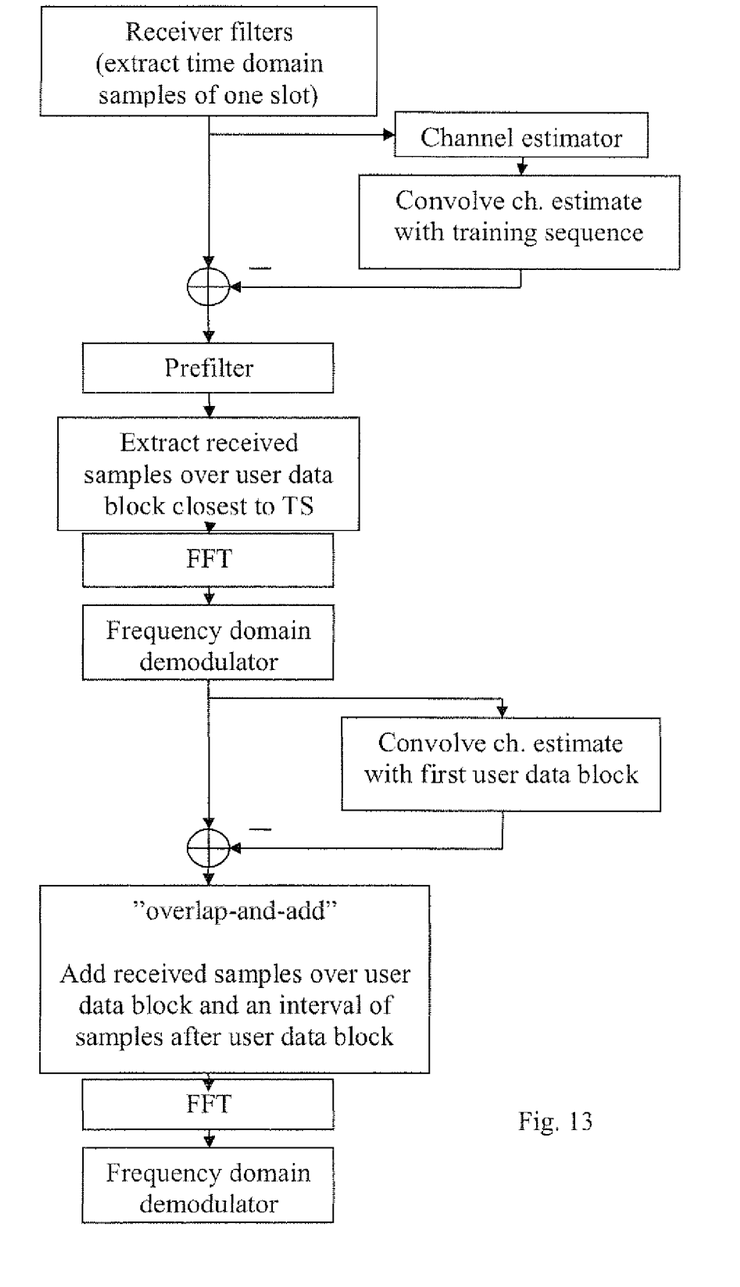
FIG. 13 shows an example receiver structure for proposed "slot format 6b" in FIG. 8.

See examples of the use of pre-filters in FIG. 12 and FIG. 13.

Figure 9:
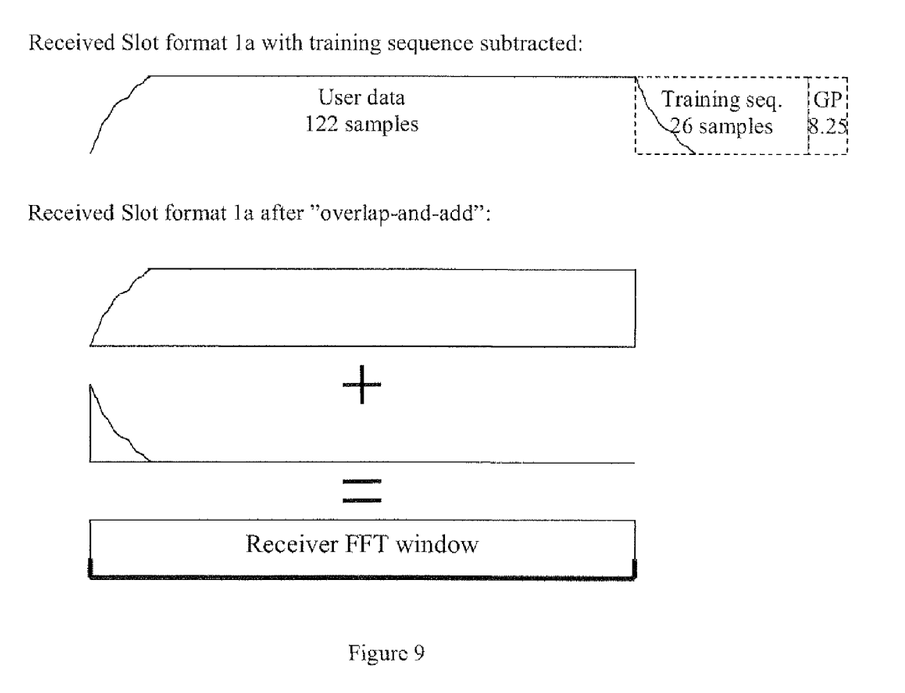
FIG. 9 shows an illustration of example "overlap-and-add" for proposed "slot format 1a" in FIG. 2.

One of the benefits with OFDM symbols is that the impact of transmission and receiver filters as well as a convolution radio channel may be efficiently compensated with a frequency domain equalizer. Note that no cyclic prefix is included in the proposed slot formats in FIG. 2 to FIG. 5. Instead an "overlap-and-add" approach, as described in "B. Muquet, Z. Wang G. B. Giannakis, M. de Courville, and P. Duhamel, "*Cyclic Prefixing or Zero Padding for Wireless Multicarrier Transmissions*" IEEE Transactions on communications, Vol. 50, No. 12, December 2002" (incorporated herein by reference), may be used in the receiver. This is illustrated in FIG. 9.

The known training sequence convolved with the estimated channel estimate is first subtracted from the received signal in the time domain before the "overlap-and-add" and FFT processing. After this subtraction, the OFDM symbol may be demodulated and detected. See FIG. 12 for an illustration.

Figure 10:
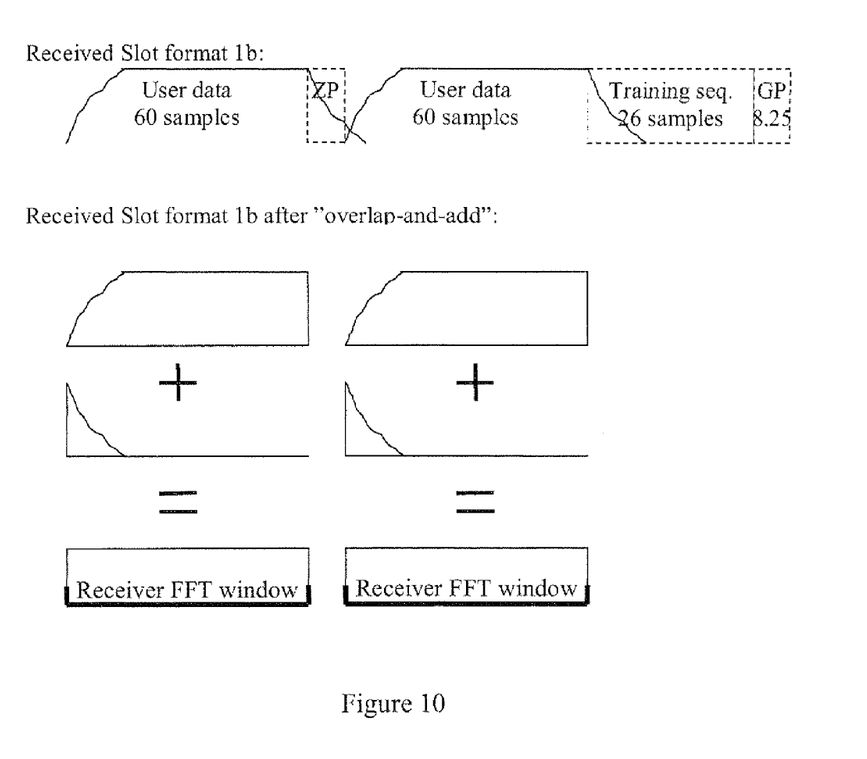
FIG. 10 shows an illustration of example "overlap-and-add" for proposed "slot format 1b" in FIG. 2.

An "overlap-and-add" approach is also illustrated in FIG. 10, for proposed "slot format 1*b*", see FIG. 2, which has two user data blocks. The short Zero Padding (ZP) interval between the user data symbols is then used.

In FIG. 8, a CP is used between the user data blocks instead of a ZP. Here, for proposed slot format 5*b*, the last samples of the user data block nearest to the training sequence are repeated before this user data block. For proposed slot format 5*c*, the last samples of two user data blocks are repeated before each user data block respectively.

Figure 11:
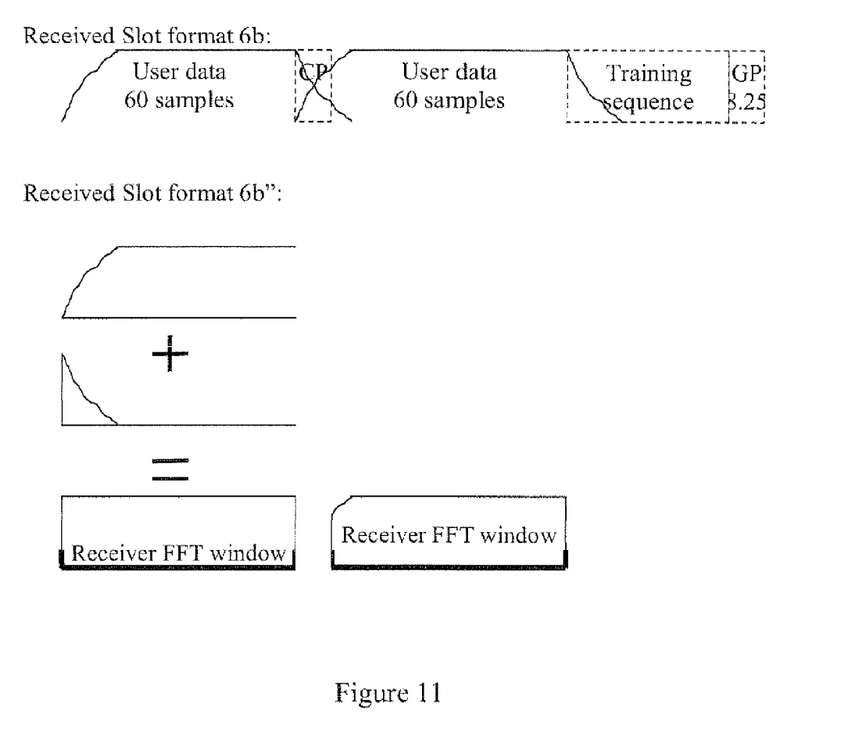
FIG. 11 shows an illustration of an example receiver for proposed "slot format 6b" in FIG. 8.

The use of CP results in a somewhat different receiver structure where an "overlap-and-add" is only needed for one of the user data blocks. This is illustrated in FIG. 11 and FIG. 13.

Figure 16:
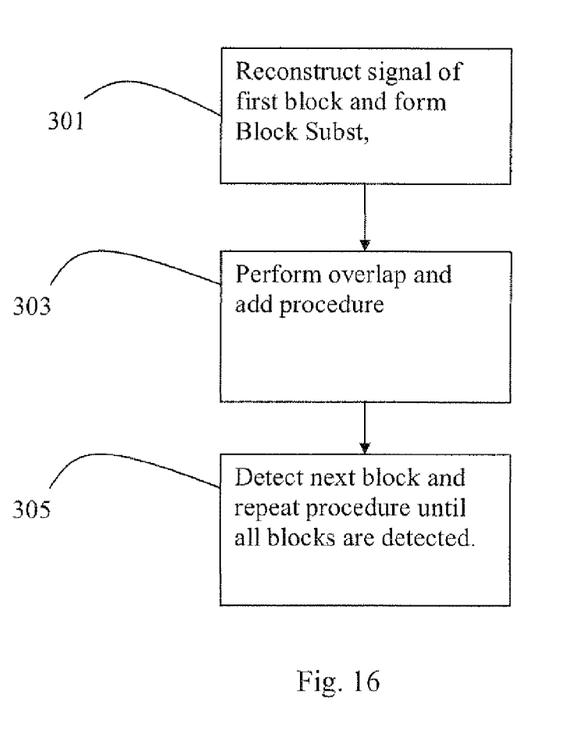
FIG. 16 is a flowchart illustrating some example procedural steps or steps performed when receiving a signal coded in a slot.

In FIG. 16 a further example of how the above methods may be used is depicted. Assume a received signal is of the following form:

|block|block2|block3 (training)| where block3 contains known training symbols.

First in act 301 block3 is used to estimate the channel. Using channel and training symbols, the received signal over block3 is reconstructed. The reconstructed signal is subtracted from block3. The resulting block (after subtraction) may be termed block3_subst. Block3_subst is mostly zeros (at least with ideal channel estimate), except at the beginning, where the energy of block2 has leaked into block3 (as a result of inter block interference, IBI). Block3_subst is represented in FIG. 9 as a "decaying ramp" inside the dashed box.

Next, in act 303, an overlap and add procedure is performed for the blocks Block3_subst and block2. Thus, in the beginning of the two blocks, in this example the reconstructed block block3 subst and the (non-reconstructed) block next to in this case block 2, are aligned. It is to be noted that it doesn't matter if the blocks have different lengths. Then the two blocks adjacent to each other are added. In this example block3_subst is added to block2. In practice this means add first few samples of the adjacent blocks. In this example block3_subst to the first few samples of block 2, i.e. first sample of block3_subst is added to first sample of block2, second sample of block3_subst is added to second sample of block2, etc.

This is represented in FIG. 9 as a sum of a user data block and a block that consists just of a decaying ramp and zeros afterward. This last block is here called block3_subst. The purpose of this overlap and add is to make block2 look periodic. Recall that block3_subst contains no energy from the symbols in block3, since that has been subtracted, it contains only the energy from block2 that has leaked into block3.

Next, in act 305, the first/next precoded block is equalized. In this example that block is block 2. This is performed by applying an inverse transform such as a DFT transform. Then the symbols of the precoded block are detected. In this case the symbols of block 2 are detected.

The acts 301-305 are then sequentially repeated for the remaining blocks (if any). The sequential repetition may be performed using a refined channel estimate using all detected symbols. In this example symbols from both block3 and block2 may be then be used at this stage. In this example the next act would then be to, using the detected symbols in block2 and the channel estimate, reconstruct the signal over block2. Then the reconstructed signal is subtracted from received signal in block2. This block may then be termed block2_subst. It is (again) mostly zeros (assuming ideal channel estimate and perfect detection), except for a "decreasing ramp" at the beginning which consists of energy from block1 that has leaked into block2 (due to time dispersion). Then overlap block2_subst to block 1. In other words align the beginning of the two blocks. Then Add block2_subst to block1. Next equalize block1 (for example by applying DFT) and detect symbols from block1. Now all symbols from the received slot comprising the three blocks have been detected and the slot may be output for further processing.

As has been described above the use of an "overlap-and-add" receiver, where blocks are sequentially subtracted from the received signal Inter symbol interference (ISI) and Inter block interference (IBI) may be diminished or eliminated. The process typically starts with the training sequence (that is known) and the channel (that may be estimated from the known training sequence). With the channel and training symbols, part of the received signal may be reconstructed as illustrated in FIGS. 9 and 10. Then the reconstructed received signal may be overlapped-and-added to a first data block. This first data block will now suffer from less IBI/ISI. The first data block is then demodulated in the frequency domain by applying an inverse transform to the transform used to precode the user data block. E.g. a Discrete Fourier Transform (DFT) may typically be applied. Now the process is repeated on the second user data block (if there is a second block), and then on the third, etc. At each act the procedure starts with a channel estimate and known symbols, typically the training sequence and/or previously demodulated symbols), reconstruct part of the signal by convolving with channel, and then overlap-and-add to the next block. This is shown in FIG. 13.

An additional pre-processing act shown also in FIG. 13 that may be used is to apply a so-called prefilter. The function of this filter is to compact or shorten the channel by concentrating the largest possible amount of energy in the smallest possible number of channel taps. In this way the ISI and IBI are further reduced prior to the overlap-and-add sequential procedure.

Figure 14:
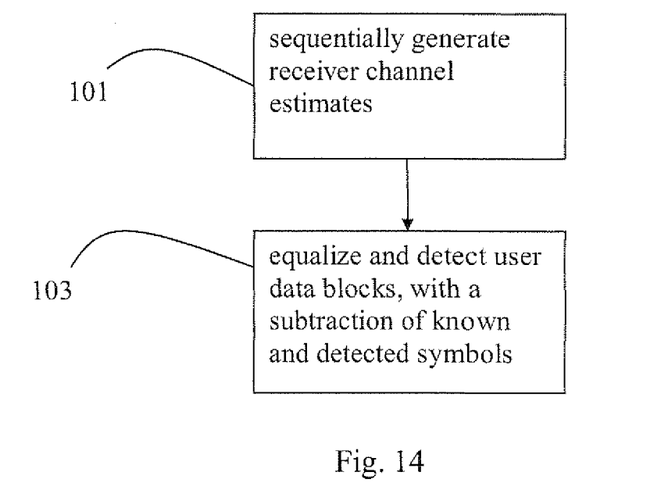
FIG. 14 is a flowchart illustrating some example procedural steps or acts performed when receiving a signal coded in a slot.

In FIG. 14 a method of receiving a signal coded in a slot is illustrated. The slot comprises at least one user data block and a training sequence, wherein the at least one user data block is coded using a pre-coder, and the training sequence is modulated in the time domain. When receiving such a slot the receiver first in act 101 sequentially generates receiver channel estimates. Then in act 103 the receiver equalizes and detects user data blocks, with a subtraction of known and detected symbols.

Figure 15:
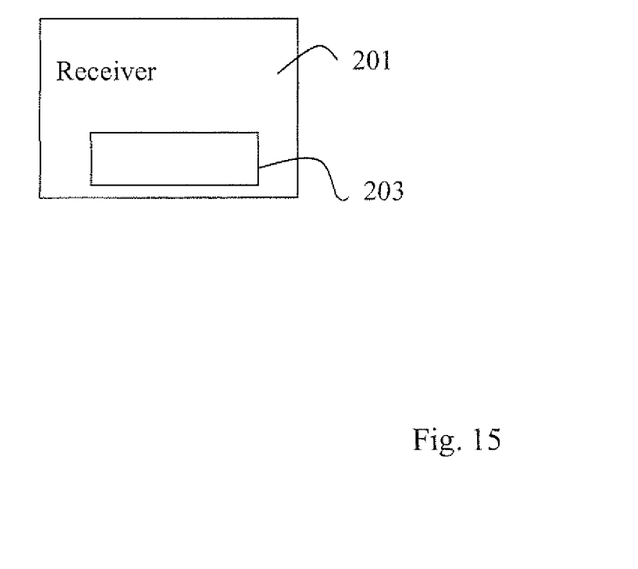
FIG. 15 shows a receiver according to an example embodiment

In FIG. 15 depicts a receiver 201 for receiving data in accordance with the methods described herein. The receiver 201 comprises controller circuitry 203 for performing the various steps or acts required when coding a slot for transmission in accordance with the principles described herein. The controller circuitry may be implemented using suitable hardware and or software. The hardware may comprise one or many processors that may be arranged to execute software stored in a readable storage media. The processor(s) may be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

By exploiting the multi-block structure of the used slot format having a training sequence in the time domain and at least one pre-coded user data block to sequentially overlap-and-add, using in the first act known symbols and using detected symbols in each subsequent act an improved receiver may be provided. This results in less ISI/IBI and therefore increased performance.

The technology disclosed herein as described herein may, of course, be carried out in other ways than those specifically set forth herein without departing from essential characteristics of the invention. The present example embodiments are to be considered in all respects as illustrative and not restrictive, and all changes coming within the meaning and equivalency range of the appended claims are intended to be embraced therein.

The invention claimed is:

1. A method of receiving a signal coded in a slot, the slot comprising at least one user data block, a training sequence, and at least one sequence of tail bits, wherein the at least one user data block is coded using a pre-coder, and the training sequence is modulated in the time domain, the method comprising:
sequentially generating receiver channel estimates, and
equalizing and detecting user data blocks, with a subtraction of known and detected symbols convolved with said channel estimates, wherein the equalizing and detecting the user data blocks comprises aligning a reconstructed symbol block sequence overlapped with an adjacent non-reconstructed symbol block sequence and adding the reconstructed symbol block sequence to the adjacent non-reconstructed symbol block sequence,
wherein blocks of training sequences and tail bits are known, and user data blocks are sequentially removed in an order in which they are equalized and detected.

2. The method according to claim 1, wherein an energy compaction pre-filter is used for the received signal information.

3. The method according to claim 1, further comprising:
subtracting a training sequence convolved with an estimated channel estimate from the received signal to generate an after subtraction resulting block; then
performing an overlap and add procedure by aligning the after subtraction resulting block and an adjacent block and adding at least a portion of the after subtraction resulting block to at least a portion of the adjacent block; and then
equalizing the adjacent block by performing an inverse transform to detect symbols of the adjacent block.

4. A receiver for receiving a signal coded in a slot, the slot comprising at least one user data block, a training sequence, and at least one sequence of tail bits, wherein the at least one user data block is coded using a pre-coder, and the training sequence is modulated in the time domain, the receiver comprising:
controller circuitry for sequentially generating receiver channel estimates, and
controller circuitry configured to equalize and detect user data blocks, with a subtraction of known and detected symbols convolved with said channel estimates, wherein the receiver is configured to align a reconstructed symbol block sequence overlapped with an adjacent non-reconstructed symbol block sequence and to add the reconstructed symbol block sequence to the adjacent non-reconstructed symbol block sequence when equalizing and detecting user data blocks,
wherein blocks of training sequences and tail bits are known, and user data blocks are sequentially removed in an order in which they are equalized and detected.

5. The receiver according to claim 4, wherein the receiver comprises a pre-filter.

6. The receiver according to claim 5, wherein the pre-filter is an energy compaction pre-filter.

7. The receiver according to claim 4, wherein the receiver is configured to
subtract a training sequence convolved with an estimated channel estimate from the received signal to generate an after subtraction resulting block; then
perform an overlap and add procedure by aligning the after subtraction resulting block and an adjacent block and adding at least a portion of the after subtraction resulting block to at least a portion of the adjacent block; and then
equalize the adjacent block by performing an inverse transform to detect symbols of the adjacent block.

* * * * *